United States Patent [19]

Davis et al.

[11] Patent Number: 5,695,820

[45] Date of Patent: Dec. 9, 1997

[54] METHOD FOR ALLEVIATING MARANGONI FLOW-INDUCED PRINT DEFECTS IN INK-JET PRINTING

[75] Inventors: Dale R. Davis, Poway; Michael Klein, La Mesa, both of Calif.; Carlos Miranda de Larra Carcedo, Barcelona, Spain; Bruce Mueller, Escondido, Calif.; Ramon-Bartolome Pastor Martinez, Barcelona, Spain; Rana Raychoudhury, Barcelona, Spain; Albert Such, Barcelona, Spain

[73] Assignee: Hewlett-Packard Company, Palo Alto, Calif.

[21] Appl. No.: 667,245

[22] Filed: Jun. 20, 1996

[51] Int. Cl.$^6$ ............... B05D 1/36; B05D 5/00; B41J 2/175
[52] U.S. Cl. ............ 427/261; 427/265; 347/84; 347/93; 347/95; 347/96; 347/100
[58] Field of Search ............... 427/261, 265; 347/84, 93, 95, 96, 100, 43

[56] References Cited

U.S. PATENT DOCUMENTS

| | | | |
|---|---|---|---|
| 4,554,181 | 11/1985 | Cousin et al. | 427/261 |
| 4,748,453 | 5/1988 | Lin et al. | 346/1.1 |
| 4,963,189 | 10/1990 | Hindagolla | 106/22 |
| 5,085,698 | 2/1992 | Ma et al. | 106/20 |
| 5,181,045 | 1/1993 | Shields et al. | 346/1.1 |
| 5,196,236 | 3/1993 | Howard et al. | 427/265 |
| 5,198,023 | 3/1993 | Stoffel | 106/22 R |
| 5,221,334 | 6/1993 | Ma et al. | 106/20 D |
| 5,302,197 | 4/1994 | Wickramanayake et al. | 106/22 H |
| 5,401,303 | 3/1995 | Stoffel et al. | 106/20 R |
| 5,428,383 | 6/1995 | Shields et al. | 347/96 |
| 5,500,661 | 3/1996 | Matsubara et al. | 347/41 |
| 5,506,609 | 4/1996 | Claassen et al. | 347/41 |
| 5,534,051 | 7/1996 | Lauw | 106/22 R |

FOREIGN PATENT DOCUMENTS

| | | | |
|---|---|---|---|
| 0179549 | 11/1989 | European Pat. Off. | C09B 45/04 |
| 0539946A1 | 10/1992 | European Pat. Off. | B41M 5/00 |

*Primary Examiner*—Shrive Beck
*Assistant Examiner*—Michael Barr

[57] ABSTRACT

Marangoni flow induced print defects are alleviated by underprinting and/or overprinting by a primary ink-jet ink with at least one treating solution that is capable of inducing the precipitation of the colorant in the primary ink-jet ink upon sustained contact. Since the time scale of precipitation is fast compared with the development of print defects due to Marangoni flow, the deleterious effects of Marangoni flow are forestalled. The method of the invention offers an effective and easily-implemented solution to the problem of Marangoni flow induced print defects that supplants the use of specially-treated paper and its associated high cost and inconvenience.

22 Claims, No Drawings

5,695,820

1

METHOD FOR ALLEVIATING MARANGONI FLOW-INDUCED PRINT DEFECTS IN INK-JET PRINTING

TECHNICAL FIELD

The present invention relates to ink-jet inks employed in ink-jet printing, and, more particularly, to the underprinting and/or overprinting of ink-jet inks to induce precipitation of the colorants contained therein and to thereby alleviate the occurrence of Marangoni flow-induced print defects.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements is arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing a plurality of such resistor elements in a particular order in a given primitive forms alphanumeric characters, performs area-fill, and provides other print capabilities on the medium.

Ink-jet inks used in thermal ink-jet printing typically comprise a colorant and a vehicle, with the vehicle often containing water and other relatively lower surface tension liquids. Printing with ink-jet inks may result in various print defects caused by the occurrence of Marangoni flow, defined herein to be ink migration driven by surface tension gradients. Surface tension gradients occur when a differential within the surface tension of a liquid develops. To illustrate, if a 40% solution of ethyl alcohol and water is placed in a capped bottle, the vapor pressure of the water alcohol mixture will come to equilibrium in the air space above the liquid in the bottle. There is no differential in surface tension and consequently no Marangoni flow. However, in an open container, the alcohol vaporizes faster than the water. A meniscus forms at the point at which the solution touches the sides of the container. The upper part of the meniscus is alcohol-poor due to evaporation of the alcohol, such that the lower part of the meniscus is alcohol-rich in comparison. Since water has a higher surface tension than alcohol, the solution at the air/liquid interface will develop a higher surface tension than the remainder of the meniscus. The higher surface tension solution at the top of the meniscus will pull solution up the side of the glass and form a bead of liquid at the top of the meniscus.

It follows that, while a variety of solvents and other components may impart properties essential to the performance of the ink-jet inks, their presence can induce surface tension gradients that lead to deleterious Marangoni flow induced print defects. There are at least three basic mechanisms in ink-jet printing by which Marangoni flow induced print defects can occur, namely, (1) absorption-driven Marangoni flow; (2) haloing; and (3) micro-haloing.

In absorption-driven Marangoni flow, the preferential absorption of a component of the ink solution by the print

2 media induces the surface tension differential. For example, if an ink-jet ink is printed as a swath onto a print media that preferentially absorbs the low surface tension component of the ink from the air/ink/medium interface, then the surface tension of the remaining ink increases, causing the liquid from the center of the swath to flow to the edges of the swath carrying colorant with it. This example of absorption-driven Marangoni flow in ink-jet printing is analogous to the above water/alcohol example in which evaporation of the alcohol changes the surface tension gradient within the liquid, inducing Marangoni flow.

Haloing occurs when two swaths of ink of different surface tension are printed next to one another. For example, when an ink having a high surface tension is printed adjacent to an ink having a low relative surface tension, the high surface tension ink will draw in the low surface tension ink into itself, leaving a light "halo" around the interface between the two inks.

Finally, micro-haloing occurs when a few dots of a low surface tension ink are placed in a field of high surface tension ink. The result is that the low surface tension ink is pulled into the high surface tension ink, leaving a much larger and lighter area of low surface tension ink than originally deposited.

Previous methods for dealing with Marangoni flow induced print defects were based on the recognition that Marangoni flow occurs slowly compared to the time necessary to achieve precipitation of the colorant in an ink. Accordingly, approaches for alleviating Marangoni print defects have exploited the kinetic difference between Marangoni flow and precipitation of the colorant.

One approach exploiting this difference in kinetics was developed by Chartham Papers (Canterbury, England). Their approach consisted of pretreating printer paper with metal salts such as magnesium sulfate and calcium chloride, both of which induce the colorant in the ink to precipitate. Although ink flow may still occur upon contact with the treated media, the liquid phase flows without carrying the colorant. U.S. Pat. No. 4,554,181, entitled "Ink Jet Recording Sheet Having a Bicomponent Cationic Recording Surface" and assigned to Mead Corporation, discloses treating paper with metal salts, namely a water-soluble polyvalent metal salt and a cationic polymer, as a method for fixing acid dyes. Specifically, the '181 patent discloses that it is the cationic groups in the polymer that serve to precipitate anionic dyes in the ink.

While treating paper with metal salts is effective in inducing precipitation of colorants, the additional cost of specially-treated paper compared to plain paper is prohibitive to consumers. Moreover, it is inconvenient that the choice of print media is limited to a particular specially-treated paper.

Accordingly, a need remains for a method by which Marangoni flow induced print defects can be substantially reduced or eliminated in ink-jet printing without resorting to the high cost and inconvenience associated with using specially-prepared paper.

DISCLOSURE OF INVENTION

In accordance with the invention, a method is provided which alleviates Marangoni flow induced print defects when ink-jet printing by layering the desired or primary ink-jet ink with at least one treating solution capable of causing the colorant in the primary ink-jet ink to precipitate. The primary ink-jet ink can be printed before or after the treating solution is applied to the print medium, but preferably the primary ink-jet ink is underprinted by the treating solution. Specifically, the printing method comprises:

(a) providing a primary ink-jet ink comprising at least one colorant and a vehicle;

(b) providing at least one treating solution capable of inducing precipitation of the colorant upon contact therewith; and (c) printing the primary ink-jet ink and the treating solution sequentially onto a print medium in a stratified fashion such that the primary ink-jet ink and the treating solution are placed in contact with one another on the print medium, thereby resulting in the precipitation of the colorant and the substantial reduction of Marangoni flow induced print defects in the primary ink-jet ink.

Thus, Marangoni flow induced print defects are reduced when ink-jet printing according to the present method by inducing the precipitation of the colorant in the primary ink-jet ink before surface tension-driven Marangoni flow can cause migration of the colorant molecules.

BEST MODES FOR CARRYING OUT THE INVENTION

The invention described herein is directed to a method for use with ink-jet color printers, particularly thermal ink-jet printers such as Hewlett-Packard's DesignJet 750C® and Designjet 755CM® printers. It enables an ink-jet color printer to produce high-quality images substantially unmarred by Marangoni flow induced print defects by inducing precipitation of the colorant of the primary ink-jet ink before surface tension-driven Marangoni flow can cause migration of the colorant molecules. Specifically, the precipitation of the primary ink-jet ink colorant is achieved by printing, either substantially underneath and/or substantially on top of the primary ink-jet ink, at least one treating solution which is capable of inducing the precipitation of the primary ink-jet ink colorant. In this manner, the primary ink-jet ink colorant and the treating solution directly interact, resulting in the timely precipitation of the colorant. The term "primary ink-jet ink", as employed herein, refers to the ink-jet ink intended to form a print image on the print media for viewing. The benefit of the invention may be realized for various types of media, particularly paper media.

The purity of all components is that employed in normal commercial practice for ink-jet inks. All concentrations are expressed in weight percent unless other indicated.

The manner by which the treating solution induces the precipitation of the primary ink-jet ink colorant is not limited to any one type of reaction, with the proviso that the precipitation reaction must occur before Marangoni flow substantially initiates and that the reaction does not compromise print quality. In one embodiment, the treating solution contains a precipitating agent that induces the precipitation of the colorant. In another embodiment, the treating solution has a sufficiently different pH from that of the primary ink-jet ink that a pH-sensitive colorant in the primary ink-jet ink precipitates upon contact with the treating solution. Other possible precipitation reactions that might be employed include, but are not limited to, oxidation-reduction reactions and condensation reactions. Regardless, it is specifically contemplated that the treating solution is actually a second ink-jet ink composition having either a precipitating agent or an appropriate pH to induce precipitation of the primary ink-jet ink colorant.

In the embodiment in which the treating solution contains a precipitating agent, it is specifically contemplated that the precipitating agent is a multi-valent metal salt. Such salts are known to reduce bleed between adjacently-printed inks by inducing precipitation of colorants (see U.S. Pat. No. 5,198,023, entitled "Cationic Dyes with Added Multi-Valent Cations to Reduce Bleed in Thermal Ink-Jet Inks", assigned to the same assignee as the present application). In accordance with the basic principles of '023, if the treating solution contains a multi-valent metal salt and the primary ink-jet ink colorant is an anionic dye, the anionic dye will precipitate upon interaction with the treating solution. In the preferred case, the treating solution is an ink-jet ink composition comprising a colorant and a vehicle which contains a multi-valent metal salt, although the treating solution may simply be a colorless solution containing the salt.

The multi-valent salt(s) must, of course, be soluble in the treating solution employed. Suitably-employed cations for the salt include, but are not limited to, alkaline earth metals of Group 2A of the Periodic Table (e.g., magnesium and calcium); the transition metals of Group 3B of the Periodic Table (e.g., lanthanum); cations from group GA of the Periodic Table (e.g., aluminum); and lanthanides (e.g., neodymium). Although any soluble multi-valent metal ions are contemplated to be suitably employed, it is preferred that calcium and magnesium are employed as cations in the practice of the invention. Suitably-employed anions associated with calcium include but are not limited to nitrate, chloride, acetate, benzoate, formate, and thiocyanate, while suitable anions associated with magnesium include nitrate, chloride, acetate, benzoate, bromide, titrate, formate, iodide, sulfate, fluoride, tartrate, and thiocyanate. Multi-valent metal salts preferably employed in the practice of the invention are the nitrate, chloride, and acetate salts of calcium and magnesium.

While U.S. Pat. No. 5,198,023 is specifically directed to dye-based ink-jet inks, it is contemplated that a similar precipitation reaction might be employed in the practice of the invention with regard to pigment-based ink-jet inks.

With specific regard to the use of multi-valent salts to induce the precipitation of dye-based inks, the concentration of the multi-valent salt may range from about 1 to 11 wt % of the treating solution composition in the event the treating solution is an ink-jet ink. Less than about 1 wt % may not be effective in precipitating out the colorant in the primary ink-jet ink, while greater than about 11 wt % may result in precipitation of the colorant, if any, in the treating solution itself, which is undesirable. Preferably, the multi-valent salt represents about 3 to 11 wt % of the treating solution composition, and more preferably, 3 to 6 wt %.

The colorant, if any, employed in the treating solution may be any dye or pigment that does not precipitate in the presence of the precipitating agent and that is compatible with the primary ink-jet ink as well as the remaining components in the inks of the treating solution. Although the invention is not so limited, it is contemplated that the active species of the precipitating agent will be cationic in nature, such as with a multi-valent metal salt, such that the colorant of a dye-based treating solution must not be susceptible to precipitation upon interaction with such cationic species. Examples of cationic dyes that may be employed in the treating ink-jet ink solution include, but are not limited to, Basic Blue 3, Direct Blue 199, Direct Blue 9, Basic Violet 7, Reactive Red 180, Acid Red 52, Basic Yellow 13, Basic Yellow 51, and Acid Yellow 23.

In the same embodiment of employing a precipitating agent in the treating solution, it is contemplated that the primary ink-jet ink may comprise any dye-based or pigment-based ink-jet ink with the proviso that its colorant must be capable of being precipitated out of solution upon contact with the precipitating agent.

With regard to particular dyes that may be employed in the primary ink-jet ink, any dye that may be precipitated by a precipitating agent in the corresponding treating solution may be employed. Although the invention is not so limited, it is contemplated that the active species of the precipitating agent will be cationic in nature, such as with a multi-valent metal salt, such that certain anionic dyes might typically serve as colorants in the primary ink-jet ink to achieve precipitation upon contact with the metal salt. Examples of anionic dyes that may be employed in the primary ink-jet ink include, but are not limited to, Food Black 2, Direct Black 19, Acid Blue 9, and Direct Red 227. The concentration of such a dye preferably ranges from about 0.1 to 7 wt % of the primary ink-jet ink composition. Less than about 0.1 wt % results in an ink of unacceptable lightness, while greater than about 7 wt % results in clogging of the orifices in the ink-jet pen. More preferably, the dye is present within the range of about 0.1 to 4 wt % of the primary ink-jet ink composition. A mixture of dyes may also be employed.

Examples of black dye-based ink-jet inks that may be benefited in the practice of the invention as primary ink-jet inks are disclosed and claimed, for example, in U.S. Pat. No. 4,963,189, entitled "Waterfast Ink Formulations with a Novel Series of Anionic Dyes Containing Two or More Carboxyl Groups" and assigned to the same assignee as the present application.

With regard to particular pigments that may be employed in the primary ink-jet ink, any pigment that may be precipitated by a precipitating agent in the corresponding treating solution may be employed. An example of a pigment that may be suitably employed in the primary ink-jet ink includes, but is not limited to, the pigment contained in the proprietary black ink composition employed in Hewlett-Packard's DeskJet 660® ink-jet printer. A mixture of pigments may also be employed.

Suitable examples of black pigment-based ink-jet inks having colorants that are capable of precipitating in the presence of multi-valent salts are disclosed and claimed, for example, in U.S. Pat. No. 5,085,698, entitled "Aqueous Pigmented Inks for Ink Jet Printers"; in U.S. Pat. No. 5,221,334, entitled "Aqueous Pigmented Inks for Ink Jet Printers"; and in U.S. Pat. No. 5,302,197 entitled "Ink Jet Inks", all assigned to E.I. DuPont de Nemours and Company.

Turning now to the embodiment in which a pH differential between the treating solution and primary ink-jet ink is used to precipitate the primary ink-jet ink colorant, a patent application entitled "Bleed Alleviation in Ink-Jet Inks Using Organic Acids", application Ser. No. 08/567,974, filed Dec. 6, 1995 [PD- 1093247-1], assigned to the same assignee as the present application, employs a pH-differential mechanism to achieve bleed control between adjacently-printed inks. More specifically, that application discloses pairing an ink-jet ink having a pH-sensitive colorant with an ink-jet ink having a 0.5 to 20 wt % of an organic acid and a sufficiently different pH, such that the pH-sensitive colorant precipitates when the two inks are placed in contact by being printed adjacently to one another. The presence of the organic acid in the ink-jet ink composition reduces the pH differential required to render insoluble the pH-sensitive colorant. For purposes of the present application, the treating solution would contain the organic acid component, while the primary ink would contain the pH-sensitive colorant.

Therefore, the pH-sensitive colorant in the primary ink precipitates when over-printed or underprinted by a treating solution having an appropriate pH differential. Without the organic acid component, the pH differential between the primary ink and the treating solution would necessarily be about 4 to 5 units, whereas the presence of the organic acid component lowers the required pH differential to about 3 units or even less. Therefore, assuming the primary ink-jet ink has a pH of about 8, the pH of the treating solution could be as high as 5 to achieve precipitation of a pH-sensitive colorant, assuming the presence of an organic acid component. It is noted that, while the specific examples herein are directed to the use of a treating solution having a lower pH than the pH-sensitive primary ink, it is also possible to employ treating solution having a higher pH than the pH-sensitive primary ink. In this case, the pH-sensitive primary ink would have the property that it precipitates as the pH is increased.

The organic acid component should be present in the treating solution at a concentration ranging from about 0.5 to 20 wt %. An organic acid concentration of less than about 0.5 wt % would be insufficient to effectively reduce the pH differential, while an organic acid concentration of more than about 20 wt % would affect the reliability of printhead operation. Preferably, the acid concentration is in the range of about 1 to 5 wt %.

Examples of organic acids that may be suitably employed in the practice of the invention include, but are not limited to, mono-, di-, and polyfunctional organic acids. In general, it is contemplated that any soluble organic acid having a pKa equal to or less than that of the pH-sensitive colorant of concern may be suitably employed. Preferably, one of the following classes of organic acids is employed: polyacrylic, acetic, glycolic, malonic, malic, maleic, ascorbic, succinic, glutaric, fumaric, citric, tartaric, lactic, sulfonic, and ortho-phosphoric acid and derivatives thereof. The organic acid component may also comprise mixtures of appropriate organic acids. The particular acid employed depends the particular ink formulations. Glycolic acid is generally preferred, although any of the other organic acids may also be suitably employed in the practice of the invention.

A treating solution employing an organic acid component and having an appropriate pH will render insoluble a pH-sensitive colorant contained in the primary ink-jet ink composition. A pH-sensitive colorant is a colorant that becomes insoluble under specific and well-defined pH conditions. In the practice of the invention, the pH-sensitive colorant may be either a dye or a pigment. Examples of pH-sensitive dyes are carboxylated dyes, such as azo dyes, xanthene dyes, copper phthalocyanine dyes, and the like. Examples of inks with pigments that may be suitably employed in the practice of the invention include any pigment that is dispersed with a dispersant having a pH-sensitive functionality, for example, the Joncryl® polymers available from S.C. Johnson Polymer (Racine, Wis.). Other colorants exhibiting differential solubility with pH may also be employed in the practice of the invention.

In the pH-differential embodiment, the colorant employed in the treating solution, if any, may be either a dye or a pigment, although it is contemplated that the treating solution ink composition will be dye-based, employing any of the water-soluble dyes used in inks for ink-jet printers. Examples of such dyes include, but are not limited to, Food Black 2, Carta Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9, Acid Red 17, Acid Red 52, Acid Red 249, and Reactive Red 180. The concentration of such a dye preferably ranges from about 0.1 to 7 wt %. Less than about 0.1 wt % results in an ink of unacceptable lightness, while greater than about 7 wt % results in clogging of the orifices in the ink-jet pen. More preferably, the dye is present within the range of about 0.1 to 4 wt % of the ink-jet ink composition. A mixture of dyes may also be employed.

The ink vehicles of the primary ink-jet ink and the ink-jet ink treating solution(s) may comprise such vehicle components found in commercial practice as are compatible with their respective colorants and with one another. A dye-based primary ink-jet ink or treating solution has a vehicle preferably comprising, in addition to the precipitating agent, at least one diol, at least one glycol ether, 2-pyrrolidone, "other" components such as surfactants and biocides, a buffer, and water. More specifically, the preferred ink-jet ink vehicle, in addition to any precipitating agent or organic acid component, is as follows: (a) about 3 to 20 wt % of at least one diol; (b) up to about 5 wt % of at least one glycol ether; (c) about 3 to 9 wt % of 2-pyrrolidone; (d) about 0.5 to 5 wt % of at least one component selected from the group consisting of surfactants and biocides; (e) a sufficient amount of buffer to achieve the selected pH; and (g) the balance water. While the above-described ink vehicle is preferred, any vehicle suitable for ink-jet ink compositions may be employed in the practice of the invention, so long as it is compatible with the colorant and the remaining components in both the primary ink and the treating solution.

Examples of diols that may be employed in the ink vehicle include any of, or a mixture of two or more of, such compounds as ethanediols (e.g., 1,2-ethanediol); propanediols (e.g., 1,2-propanediol, 1,3-propanediol, 2-ethyl-2-hydroxymethyl- 1,3-propanediol, ethylhydroxypropanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably, 1,5-pentanediol and EHPD are employed in the ink vehicle.

The glycol ether component of the ink vehicle may comprise any of the glycol ethers and thioglycol ethers, and mixtures thereof, commonly employed in ink-jet ink compositions. Examples of such compounds include polyalkylene glycols such as polyethylene glycols (e.g., diethylene glycol, triethylene glycol, tetraethylene glycol, etc.) polypropylene glycols (e.g., dipropylene glycol, tripropylene glycol, tetrapropylene glycol, etc.); polymeric glycols (e.g., PEG 200, PEG 300, PEG 400, PPG 400, etc.) and thioglycol. Preferably, diethylene glycol is employed in the ink vehicle.

Consistent with the requirements for this invention, various other types of additives may be employed in the ink to optimize the properties of the ink composition for specific applications, such as surfactants, buffers, biocides, and the like, all of which are commonly-employed additives in ink-jet printing. If crusting is a problem, then a humectant can be added as well.

With particular regard to the surfactant component, one well-known purpose of a surfactant is to prevent color to color bleed by increasing the penetration of the inks into the print medium. Surfactants may also be employed to create a substantially uniform surface energy in the ink, thereby reducing the occurrence of mis-directed drops due to puddling of ink on the nozzle plate. Examples of classes of surfactants that are preferably employed in the present ink compositions including a precipitating agent include anionic surfactants and nonionic surfactants.

Buffers employed to stabilize pH in inks containing a multi-valent salt should be organic-based biological buffers, since inorganic buffers would likely precipitate in the presence of the relatively large amount of multivalent metal salts in the ink composition. Examples of preferably-employed buffers include Trizma Base, which is available from, for example, Aldrich Chemical (Milwaukee, Wis.), and 4-morpholine ethane sulfonic acid (MES). In the embodiment in which the primary ink-jet ink has a pH-sensitive colorant, it is important to note that the buffer capacity must not be so high as to overwhelm the effects of the treating solution. In practice, precipitation may be effected in the primary ink when the primary ink contains a buffer, such as tris[hydroxymethyl]aminomethane or a phosphate or borate buffer.

As is well-known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities.

An example of an ink-jet ink composition that is formulated in accordance with the invention to serve as a treating solution by including a precipitating agent, is the following dye-based ink: (a) about 4 wt % Direct Blue 199-TMA; (b) about 7.5 wt % EHPD; (c) about 7.5 wt % 2-pyrrolidone; (d) about 8.0 wt % 1,5-pentanediol; (e) about 8.0 wt % $Mg(NO_3)_2 \cdot 6H_2O$; (f) about 2.25 wt % nonionic surfactant; (g) about 0.2 wt % Trizma Base; and (h) the balance water.

An example of an ink-jet ink composition that is formulated in accordance with the invention to serve as a treating solution by including an organic acid component and having an appropriate pH, is the following dye-based ink: (a) about 2.75 wt % Acid Yellow 23-TMA; (b) about 4.0 wt % diethylene glycol; (c) about 8.0 wt % EHPD; (d) about 4.0 wt % 2-pyrrolidone; (e) about 2.5 wt % nonionic surfactant; (f) about 5.0 wt % citric acid; (g) sufficient tetramethylammonium hydroxide to buffer the pH of the ink solution to about 4; and (h) the balance water.

An example of a primary ink-jet ink composition having a colorant that is precipitated by both of the above treating solutions is the following black dye-based ink, which contains a colorant capable of being precipitated upon contact with a multivalent metal salt as well as upon contact with the lower pH treating solution ink: (a) about 2.2 wt % of a black carboxylated dye, such as Black 286 dye and Black 287 dye which are similar to the dyes disclosed in above-referenced U.S. Pat. No. 4,963,189; (b) about 7.5 wt % 2-pyrrolidone; (c) about 0.2 wt % tris(hydroxymethyl)-aminomethane; (d) about 0.06 wt % ethylenediaminetetraacetic acid (EDTA) in flee acid form; (e) about 0.2 wt % ammonium dihydrogen phosphate; (f) about 0.0075 wt % Voranol 3010 polyol; (g) about 0.3 wt % Proxel GXL; and (h) the balance water.

If the above-described black primary ink-jet ink is underprinted or overprinted by either of the above-described treating solution ink-jet inks on a print medium, the carboxylated black dye would precipitate such that Marangoni flow induced print defects would have been avoided in the black ink-jet ink.

In sum, the present method involves pairing a primary ink-jet ink composition with a treating solution by underprinting or overprinting to bring about the desired substantial elimination of Marangoni flow induced print defects in the primary ink.

In the practice of the invention, the primary ink-jet ink and the treating solution are deposited on the print medium by an ink-jet printer in a stratified fashion such that the primary ink-jet ink is in vertical communication with the treating solution referenced perpendicular to the plane of the print medium. While it is preferred that the primary ink-jet ink is substantially overcoated or undercoated by the treating solution, an areal coverage of about 30% would be considered an optimal coverage in practice, given current printer precision and lateral diffusion of the ink components. The primary ink-jet ink and the treating solution are contained in separate ink-jet cartridges within the ink-jet printer. In one embodiment, the treating solution is deposited onto the print medium and the primary ink-jet ink is thereafter printed substantially on top thereof. For example, an ink-jet ink containing a precipitating agent may be deposited on the print medium, and a black dye-based or pigment-based primary ink-jet ink may be printed substantially on top, such that the black colorant interacts with the precipitating agent, thereby precipitating out of solution and preventing Marangoni flow print defects. In another embodiment, the primary ink-jet ink is deposited onto the print medium and the treating solution is thereafter printed substantially on top thereof. In the latter embodiment, the ink-jet ink containing the precipitating agent might be exclusive of colorant. Regardless of whether the primary ink-jet ink is underprinted or overprinted by the treating solution, interaction between the colorant in the primary ink-jet ink and the treating solution is achieved such that precipitation of the colorant precedes the occurrence of undesirable Marangoni flow print defects in the primary ink-jet ink.

In order to thwart Marangoni flow in the practice of the invention, the second pass by the printer containing either the primary ink-jet ink or the treating solution (depending upon whether underprinting or overprinting is employed) must be made before Marangoni flow has substantially moved the primary ink-jet ink colorant. Typically, this will occur between 0.1 and 2 seconds, depending on the particular system and print conditions employed.

The best method to apply the treating solution and primary ink-jet ink is by dot-on-dot printing. That is, one applies a dot of treating solution followed by a dot of primary ink-jet ink. This ensures direct interaction between the treating solution and the primary ink-jet ink such that precipitation of the primary ink-jet ink colorant is optimized. Further, this preferred method works regardless of whether the treating solution contains a colorant.

In a preferred embodiment, an ink-jet ink set is employed which comprises the primary ink-jet ink along with at least one treating solution. For example, the ink-jet ink set could comprise a black primary ink and two treating solutions, such as a magenta dye-based ink-jet ink and a cyan dye-based ink-jet ink. Thus, the magenta and cyan ink-jet inks serve as treating solutions that induce the precipitation of the black colorant in the primary ink, thereby preventing Marangoni flow induced print defects in the black ink. In this embodiment, a mixture of the magenta, cyan, and black primary inks is deposited onto the print medium on a first pass by the ink-jet printer and is subsequently topped by the black primary ink on a second pass by the ink-jet printer. This embodiment achieves a black having a more uniform appearance and a higher optical density than when a single application of treating solution overprints or underprints the primary ink-jet ink. In one preferred embodiment, the first pass of the printer achieves an area fill comprising 25% black, 37.5% magenta, and 37.5% cyan with a second pass achieving an area fill comprising 75% black, with the percentages representing percent coverage of the area fill by the particular ink. In other words, the first pass would result in any 25% of the pixels being filled with black, any 37.5% of the pixels being filled with magenta, and any 37.5% of the pixels being filled with cyan, such that some of the pixels will contain more than one color after the first pass. Thereafter, the second pass would result in any 75% of the pixels being filled with black. In another preferred embodiment, the first pass area fill comprises 25% black, 18.75% magenta, and 18.75% cyan; a second pass area fill comprises 25% black; and the first and second passes are then repeated as third and fourth passes. Most preferably, the first pass area fill comprises 50% black, 37.5% magenta, and 37.5% cyan, with a second pass area fill comprising 50% black primary ink that is printed on top of the deposited ink-jet ink set. It is noted that these preferred print modes evidence reduced dry time for the black ink as opposed to printing an area fill comprising 100% black ink in a single pass.

The alleviation of Marangoni flow-induced print defects achieved in the practice of the invention is demonstrated by the following example.

EXAMPLE

The black ink employed in Hewlett-Packard's DesignJet® 755CM was printed onto a paper media without having been overprinted or underprinted by a treating solution. The black ink has a proprietary composition and is commercially available in an ink cartridge having the trade designation HP 51645A. When printed as a solid area fill, the black ink evidenced migration from Marangoni print defects in the form of unevenness at the edges of the area fill. When color ink-jet inks (commercially available in an ink cartridge having the trade designation HP 51644) were printed adjacent the black ink, haloing occurred whereby the higher-surface tension black ink pulled in the lower surface tension color ink, thereby resulting in a light halo around the interface between the two inks. Finally, when a few dots of the HP51644 color ink were printed in a field of the higher-surface tension black ink, microhaloing occurred whereby the color ink was pulled into the black ink leaving a much larger and lighter area of color ink than originally deposited.

In contrast, the HP 51645A black ink was then underprinted by a mixture of cyan (HP 51644C), magenta (HP 51644M), and black ink in accordance with the invention. More specifically, the HP DesignJet® 755CM was employed to print a first pass of 50% black, 37.5% cyan, and 37.5% magenta and a second pass of 50% black. The Marangoni flow-induced print defects were noticeably decreased compared to printing the black ink alone without benefit of a treating solution. In sum, there was substantially no evidence of migration, haloing, or microhaloing in the black and color ink-jet inks when printed in accordance with the invention.

INDUSTRIAL APPLICABILITY

The present ink-jet printing method for controlling Marangoni flow induced print defects as disclosed herein is expected to find commercial use in ink-jet printing, particularly in thermal ink-jet color printers.

Thus, there has been disclosed a method for controlling Marangoni flow induced print defects in ink-jet printing. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A method of reducing Marangoni induced print defects in ink-jet printing, comprising the steps of:
    (a) providing a primary ink-jet ink comprising at least one colorant and a vehicle;
    (b) providing at least one treating solution capable of inducing precipitation of said colorant upon contact therewith; and
    (c) printing said primary ink-jet ink and said at least one treating solution sequentially onto a print medium in a stratified fashion such that said primary ink-jet ink and said at least one treating solution are placed in contact with one another on said print medium, whereupon said at least one colorant is induced to precipitate such that a reduction of Marangoni flow induced print defects in said primary ink-jet ink is achieved.

2. The method of claim 1 wherein said at least one treating solution is printed onto said print medium, forming a first layer, and said primary ink-jet ink is subsequently printed onto said first layer, forming a second layer.

3. The method of claim 1 wherein said primary ink-jet ink is printed onto said print medium, forming a first layer, and said at least one treating solution is subsequently printed onto said first layer, forming a second layer.

4. The method of claim 1 wherein said at least one treating solution includes a precipitating agent capable of inducing precipitation of said colorant.

5. The method of claim 4 wherein said precipitating agent is a multivalent metal salt comprising a cation and an anion.

6. The method of claim 5 wherein said cation is selected from the group consisting of an alkaline earth metal of Group 2A of the Periodic Table, a transition metal of Group 3B of the Periodic Table, an element of Group 3A of the Periodic Table, and a lanthanide.

7. The method of claim 6 wherein said cation is selected from the group consisting of calcium and magnesium.

8. The method of claim 7 wherein said calcium forms said at least one multivalent metal salt by associating with said anion selected from the group consisting of nitrate, chloride, acetate, benzoate, formate and thiocyanate and said magnesium forms said at least one multivalent metal salt by associating with an anion selected from the group consisting of nitrate, chloride, acetate, benzoate, bromide, titrate, formate, iodide, sulfate, fluoride, tartrate, and thiocyanate.

9. The method of claim 8 wherein said calcium and magnesium cations are associated with an anion selected from the group consisting of nitrate, chloride, and acetate.

10. The method of claim 5 wherein said multivalent metal salt is present in said at least one treating solution in an amount within the range of about 1 to 11 wt %.

11. The method of claim 10 wherein said at least one treating solution consists essentially of an ink-jet ink comprising: (a) about 0.1 to 4 wt % of at least one dye; (b) about 3 to 20 wt % of at least one diol; (c) up to about 5 wt % of at least one glycol ether; (d) about 3 to 9 wt % of 2-pyrrolidone; (e) about 0.5 to 5 wt % of at least one component selected from the group consisting of surfactants and biocides; (f) a sufficient amount of buffer to achieve a selected pH; (g) about 3 to 11 wt % of at least one multivalent metal salt; and (h) the balance water.

12. The method of claim 1 wherein said colorant is pH-sensitive and said at least one treating solution has a predetermined pH such that a pH differential exists between said primary ink-jet ink and said at least one treating solution, said pH differential being sufficient to effect precipitation of said pH-sensitive colorant upon contact of said primary ink-jet ink with said at least one treating solution.

13. The method of claim 12 wherein said at least one treating solution includes at least one organic acid at a concentration ranging from about 0.5 to 20 wt %.

14. The method of claim 13 wherein said at least one organic acid is selected from the group consisting of monofunctional organic acids, difunctional organic acids, and polyfunctional organic acids.

15. The method of claim 14 wherein said at least one organic acid is selected from the group consisting of polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, and ortho-phosphoric acid and derivatives thereof.

16. The method of claim 13 wherein said pH differential ranges from about 1 to 3 units.

17. The method of claim 12 wherein said at least one treating solution consists essentially of an ink-jet ink comprising: (a) about 0.1 to 4 wt % of at least one dye; (b) about 3 to 20 wt % of at least one diol; (c) up to about 5 wt % of at least one glycol ether; (d) about 3 to 9 wt % of 2-pyrrolidone; (e) about 0.5 to 5 wt % of at least one component selected from the group consisting of surfactants and biocides; (f) a sufficient mount of buffer to achieve said predetermined pH; (g) 0.5 to 20 wt % of at least one organic acid; and (h) the balance water.

18. The method of claim 12 wherein said pH-sensitive colorant comprises a colorant selected from the group consisting of carboxylated azo dyes, carboxylated copper phthalocyanine dyes, carboxylated xanthene dyes, and pigments dispersed with a dispersant having a pH-sensitive functionality.

19. The method of claim 1 wherein said at least one treating solution comprises two ink-jet inks and further comprises said primary ink-jet ink.

20. The method of claim 19 wherein said two ink-jet inks comprise a cyan ink-jet ink and a magenta ink-jet ink and wherein said primary ink-jet ink is a black ink-jet ink.

21. The method of claim 20 wherein said cyan ink-jet ink and said magenta ink-jet ink each comprise: (a) about 0.1 to 4 wt % of at least one dye; (b) about 3 to 20 wt % of at least one diol; (c) up to about 5 wt % of at least one glycol ether; (d) about 3 to 9 wt % of 2-pyrrolidone; (e) about 0.5 to 5 wt % of at least one component selected from the group consisting of surfactants and biocides; (f) a sufficient mount of buffer to achieve a selected pH ranging from about 6 to 8; (g) about 3 to 11 wt % of at least one multivalent metal salt; and (h) the balance water.

22. The method of claim 20 wherein said cyan ink-jet ink and said magenta ink-jet ink each have about 37.5% of coverage and said black ink-jet ink has about 50% coverage over an area fill on said print medium from a first pass of said printer and said black ink-jet ink has about 50% coverage over said area fill on said print medium from a second pass of said printer.

* * * * *